United States Patent Office 3,227,674
Patented Jan. 4, 1966

3,227,674
COMPOSITIONS COMPRISING POLYACETALS AND SECONDARY AND/OR TERTIARY POLYHALOALCOHOLS
William J. Middleton, Wilmington, Del., assignor to E. I. du Pont de Nemours and Company, Wilmington, Del., a corporation of Delaware
No Drawing. Filed Nov. 19, 1962, Ser. No. 238,703
18 Claims. (Cl. 260—33.4)

This application is a continuation-in-part of my copending application Serial No. 107,302, filed May 3, 1961, and now abandoned.

This invention relates to, and has as its principal object provision of, novel polymer compositions comprising, as essential ingredients, polyacetals and certain polyhalogenated alcohols.

In many applications of high molecular weight polymers, such as film casting, coating, molding, use as adhesives, etc., solubility in organic solvents is a desirable property. Solubility at low or moderate temperatures, e.g., room temperature, is especially desirable in order to avoid or minimize the degradation of the polymer which often takes place when solution must be effected at high temperature to achieve a practically useful concentration of the polymer in the solvent. In addition to fluid solutions, solid or semisolid compositions wherein the polymer is homogeneously mixed with relatively small amounts of solvent serving as plasticizer or physical modifier have great utility in polymer technology, and these also require good solubility in the solvent at ordinary temperature.

Many polyacetals suffer from the disadvantage of poor solubility in organic solvents and thus are not as broadly useful as they would otherwise be. For example, this is the case with polyoxymethylenes, and especially with the special polyoxymethylenes, characterized by high toughness and high thermal stability, described in U.S. Patents 2,768,994, 2,964,500 and 2,998,409. These polymers have already achieved outstanding technical success but their use has been limited by the fact that no good ordinary temperature solvent was available for them.

It has now been found that certain fluorine-containing polyhalogenated alcohols have good solvent power at ordinary or moderate temperature for the high molecular weight polyacetals of the type defined below and in conjunction therewith yield novel compositions of matter having quite valuable properties.

These new products are homogeneous compositions comprising as their essential ingredients a synthetic, essentially linear polymer of molecular weight at least 5000, in which at least two-thirds of the repeating units contain acetal linkages, the acetal oxygens in said linkages being in open-chain configuration, i.e., not part of a cyclic structure, and a fluorine-containing polyhaloalcohol in which all halogen atoms are of atomic number 9–17, i.e., are fluorine or chlorine, said polyhaloalcohol having one of the formulas (I)

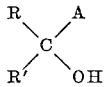

where R and R' are fluoroperhalomethyl, difluoromethyl or perfluoroalkyl, ω-hydroperfluoroalkyl or ω-chloroperfluoroalkyl of 2–4 carbon atoms, and A is a radical defined as R, hydrogen, hydroxyl, halogen, cyano, alkyl of 1–2 carbon atoms, alkoxy of 1–2 carbon atoms, fluoroalkyl or fluorohydroxyalkyl of 1–4 carbon atoms,

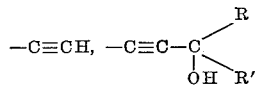

or aryl or aryloxyaryl of 1–2 six-membered rings, the aryl nuclei in the two last-mentioned groups bearing from 0–1 substituent of the formula

and from 0–3 substituents of the group of hydroxy, halogen and alkyls of 1–2 carbon atoms;

(II)

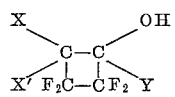

where X and X' are fluorine or chlorine and Y is hydroxyl, halogen, cyano, phenyl, halophenyl, hydroxyphenyl or alkoxy of 1–2 carbon atoms; and (III)

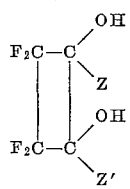

where Z and Z' are hydroxyl or alkoxy of 1–2 carbon atoms.

It will be seen from the above formulas that the polymer solvents suitable for use in the compositions of this invention are secondary and tertiary polyfluoroalcohols having a specific structure. These alcohols can be monohydric or polyhydric, and among the latter are included the gem-diols or 1,1-diols (the products of the above formulas where A, Y, Z or Z', respectively, is OH). In fact, these gem-diols, which can also be called polyfluoroketone hydrates, are among the most effective solvents for the purposes of this invention.

The most readily accessible polyfluoroalcohols are those corresponding to Formula I. In this group, the preferred compounds from the standpoint of general usefulness as solvents are those in which A is hydrogen or hydroxyl, and among these the alcohols in which R and R' are fluoroperhalomethyl (i.e., trifluoromethyl, chloridifluoromethyl or dichlorofluoromethyl) are especially preferred because of their greater accessibility and excellent solvent power combined with volatility. Other fluoroalcohols of formula I viz., those in which the symbol A represents an aryl or aryloxyaryl group which may bear a

substituent and/or hydroxyl substituents offer special advantages as plasticizers because they have high boiling points and are tenaciously retained by the polymeric material.

Many of the above defined secondary or tertiary polyhaloalcohols can be prepared by methods described in the literature or by extensions of these published methods. Others are obtainable by methods described in recently issued patents or in copending patent applications. These include:

(1) The hydrates of the polyfluoroperhalo- and ω-hydropolyfluoroperhaloketones, i.e., the compounds of Formula I where A is hydroxyl and R and R' each contain at least two fluorine atoms, and the corresponding tertiary alcohols, i.e., the compounds of Formula I where R, R' and A are polyfluoroperhaloalkyl radicals. These compounds can be prepared, as described in U.S. Patent 3,091,643, by the reaction, in a molar ratio of at least 2:1, of an ester of a polyfluoroperhalo- or ω-hydropolyfluoroperhaloalkanecarboxylic acid with an alkali metal alkoxide at temperatures below about 100° C., followed by acidification. This reaction gives the ketones and/or their hydrates, i.e., the gem-diols. The tertiary alcohols are prepared from the ketones by further reaction with the alkali metal alkoxide in the same molar ratio and same temperature range, followed by acidification.

(2) The hydrates and hemiketals of polyfluoroperhalocyclobutanones, i.e., the products of Formula II, where Y is hydroxy or alkoxy. These compounds can be prepared by the method described in U.S. Patent 3,039,995 and in U.S. Patent 3,129,248. This method comprises the hydrolysis by concentrated sulfuric acid of the 1,3,3,4,4-pentafluoro-2,2-dihalo-1-hydrocarbyloxycyclobutanes, i.e., the ethers of the formula

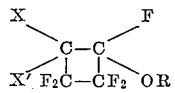

where X and X' are fluorine or chlorine and R is a hydrocarbon radical, which are themselves prepared by cycloaddition at 125–250° C. of the requisite difluoroperhaloolefin

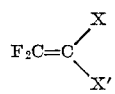

and a perfluorovinyl hydrocarbyl ether $F_2C=CFOR$. The hydrolysis step yields the polyfluoro-perhalocyclobutanones and/or their hydrates. The free ketones form hydrates or hemiketals rapidly and spontaneously by reaction with water or alcohols.

(3) The perhaloalkyl- or ω-hydroperhaloalkyl-α-haloalcohols, i.e., the compounds of Formulas I and II, where A and Y, respectively, are halogen (fluorine or chlorine). These compounds can be prepared as described in U.S. Patent 3,030,409.

(4) The 1-aryl-, 1-hydroxyaryl- and 1-haloarylperhalocyclobutanols, i.e., the compounds of Formula II where Y is aryl, hydroxyaryl or haloaryl. These compounds can be prepared by the process described in U.S. Patent 3,148,220. In this process, a 3,3,4,4-tetrafluoro-2,2-dihalocyclobutanone is reacted with an aromatic hydrocarbon in the presence of conventional Friedel-Crafts catalysts, or with a hydroxy- or halo-substituted aromatic hydrocarbon, in which case no catalyst is necessary. With the more reactive systems, the reaction is spontaneous and exothermic. In other cases, a reaction temperature in the range of 75–200° C. is suitable.

(5) The bis(fluoroalkyl)aryl- or aryloxyaryl carbinols, i.e., the compounds of Formula I where A is an aryl or aryloxyaryl radical which may be unsubstituted or may bear one

substitutent or from 1–3 alkyl, hydroxyl or halogen substituents which may be alike or different. These compounds can be prepared by the methods described in application Serial No. 107,296, filed on May 3, 1961, by D. C. England. In these methods, the appropriate di(fluoroalkyl)ketone is condensed with the appropriate aromatic reactant in the presence of the usual Friedel-Crafts catalysts, at moderate temperature in the range of 50–150° C.; or the di(fluoroalkyl)ketone is reacted with an arylmagnesium bromide in anhydrous ether, at temperatures which may be as low as −50° C. and generally need not exceed room temperature.

(6) The bis(ω-hydroperfluoroalkyl)carbinols, i.e., the compounds of Formula I where R and R' are ω-hydroperfluoroalkyl groups and A is hydrogen. These compounds can be prepared by the process described in U.S. Patent 3,022,356.

(7) The hydrates, bis-hemiketals and hydrate-hemiketals of perfluorocyclobutane-1,2-dione (the products of Formula III). These compounds are made, as described in U.S. Patent 3,133,046, by direct addition of the stoichiometric amount of water and/or an alcohol to perfluorocyclobutane-1,2-dione. This cyclic diketone is prepared by hydrolysis with concentrated sulfuric acid of a perfluorocyclobutane-1,2-diether of the formula

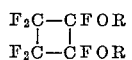

where R is a hydrocarbon radical, these diethers being themselves prepared by thermal cycloaddition of a perfluorovinyl hydrocarbyl ether $CF_2=CFOR$.

For illustrative purposes, a number of representative specific polyhaloalcohols suitable for use in the compositions of this invention are listed below by name and formula:

2H-hexafluoro-2-propanol
$$CF_3-CHOH-CF_3$$

2H-decafluoro-2-pentanol
$$CF_3-CHOH-(CF_2)_2CF_3$$

3H-dodecafluoro-3-hexanol
$$CF_3CF_2-CHOH-(CF_2)_2CF_3$$

4H-tetradecafluoro-4-heptanol
$$CF_3(CF_2)_2-CHOH-(CF_2)_2CF_3$$

3H-tetradecafluoro(2,4-dimethyl-3-pentanol)
$$\begin{array}{cc} CF_3 & CF_3 \\ | & | \\ CF_3CF-CHOH-CFCF_3 \end{array}$$

1H,3H,7H-dodecafluoro-3-heptanol
$$H(CF_2)_2-CHOH-(CF_2)_4H$$

1H,5H,9H-hexadecafluoro-5-nonanol
$$H(CF_2)_4-CHOH-(CF_2)_4H$$

Perfluoro(2,3-dimethyl-2,3-butanediol)
$$\begin{array}{cc} CF_3 & CF_3 \\ | & | \\ CF_3-C\text{---}C-CF_3 \\ | & | \\ OH & OH \end{array}$$

Perfluoro(2,2-propanediol)
$$\begin{array}{c} OH \\ | \\ CF_3-C-CF_3 \\ | \\ OH \end{array}$$

1,3,3-trichloro-1,1,3-trifluoro-2,2-propanediol
$$\begin{array}{c} OH \\ | \\ ClF_2C-C-CFCl_2 \\ | \\ OH \end{array}$$

1,1,3,3-tetrachloro-1,3-difluoro-2,2-propanediol
$$\begin{array}{c} OH \\ | \\ Cl_2FC-C-CFCl_2 \\ | \\ OH \end{array}$$

1,3-dichloro-1,1,3,3-tetrafluoro-2,2-propanediol
$$\begin{array}{c} OH \\ | \\ ClF_2C-C-CF_2Cl \\ | \\ OH \end{array}$$

Perfluoro(3,3-pentanediol)
$$\begin{array}{c} OH \\ | \\ CF_3CF_2-C-CF_2CF_3 \\ | \\ OH \end{array}$$

1,1,3,3-tetrafluoro-2,2-propanediol
$$\begin{array}{c} OH \\ | \\ HCF_2-C-CF_2H \\ | \\ OH \end{array}$$

1H,5H-octafluoro-3,3-pentanediol
$$\begin{array}{c} OH \\ | \\ H(CF_2)_2-C-(CF_2)_2H \\ | \\ OH \end{array}$$

1,5-dichlorooctafluoro-3,3-pentanediol

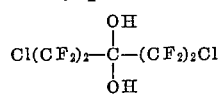

1,3-dichloro-1,1,3,3-tetrafluoro-2-methyl-2-propanol

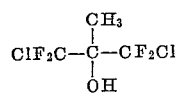

4-ethyltetradecafluoro-4-heptanol

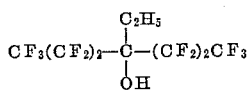

Perfluoro(2-methyl-2-propanol)

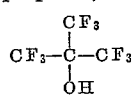

Perfluoro(4-methyl-4-heptanol)

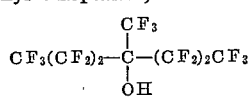

Perfluoro(4-propyl-4-heptanol)

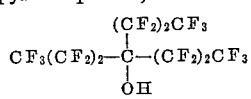

3H-dodecafluoro(2,3-dimethyl-2-butanol)

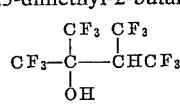

1,7-dichloro-4-(3-chlorohexafluoropropyl)dodecafluoro-4-heptanol

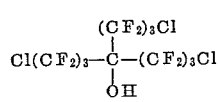

Perfluoro(4-heptanol)

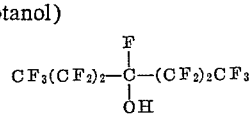

1,3-dichloropentafluoro-2-propanol

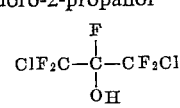

1,1,2,3,3-pentachloro-1,3-difluoro-2-propanol

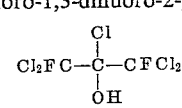

1H,7H-tridecafluoro-3-heptanol

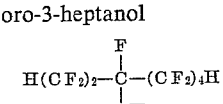

1H,9H-heptadecafluoro-5-nonanol

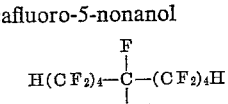

2-cyanohexafluoro-2-propanol

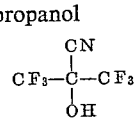

1,3-dichloro-2-cyanotetrafluoro-2-propanol

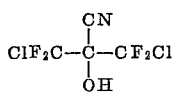

1H,7H-3-cyanododecafluoro-3-heptanol

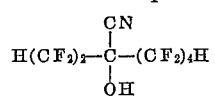

1H,7H-3-ethoxydodecafluoro-3-heptanol

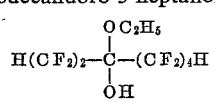

2-methoxy-1,3-dichloro-1,1,3,3-tetrafluoro-2-propanol

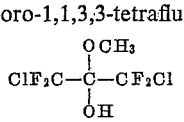

1,3-dichloro-1,1,3,3-tetrafluoro-2-phenyl-2-propanol

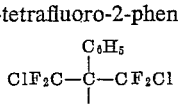

2-phenylhexafluoro-2-propanol

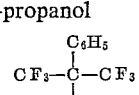

1H,7H-3-(p-hydroxyphenyl)dodecafluoro-3-heptanol

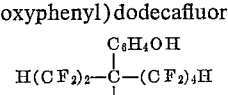

1H,7H-3-(p-tolyl)dodecafluoro-3-heptanol

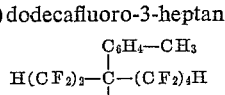

1,3 - dichloro - 1,1,3,3-tetrafluoro-2-(p-hydroxyphenyl)-2-propanol

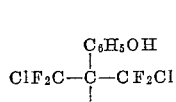

1,1,3-trichloro-1,3,3-trifluoro-2-(p-hydroxyphenyl)-2-propanol

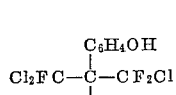

2-p-ethylphenylhexafluoro-2-propanol

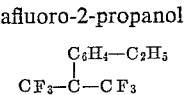

1H,7H - 3-[α-(β-hydroxynaphthyl)]dodecafluoro-3-heptanol

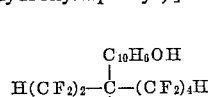

1,3-dichloro-1,1,3,3-tetrafluoro-2-(p-chlorophenyl)-2-propanol

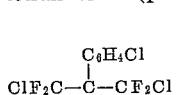

1,3-dichloro-1,1,3,3-tetrafluoro-2-(3-ethyl-4-hydroxyphenyl)-2-propanol

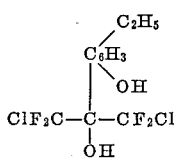

3-phenyldecafluoro-3-pentanol $$CF_3CF_2-\underset{\underset{OH}{|}}{\overset{\overset{C_6H_5}{|}}{C}}-CF_2CF_3$$

2-(4-biphenylyl)hexafluoro-2-propanol $$CF_3-\underset{\underset{OH}{|}}{\overset{\overset{C_6H_4-C_6H_5}{|}}{C}}-CF_3$$

2-(p-phenoxyphenyl)hexafluoro-2-propanol $$CF_3-\underset{\underset{OH}{|}}{\overset{\overset{C_6H_4-O-C_6H_5}{|}}{C}}-CF_3$$

1,3-dichloro-1,1,3,3-tetrafluoro-2-[(4-hydroxy-3,5-dimethyl)phenyl]-2-propanol

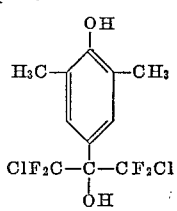

m-bis(2-hydroxyhexafluoroisopropyl)benzene $$\underset{CF_3}{\overset{CF_3}{}}\!\!\!\!>\!\!\underset{OH}{\overset{}{C}}\!\!-C_6H_4-\underset{OH}{\overset{}{C}}\!\!<\!\!\underset{CF_3}{\overset{CF_3}{}}$$

1,4-bis(2-hydroxyhexafluoroisopropyl)-2,5-dihydroxybenzene

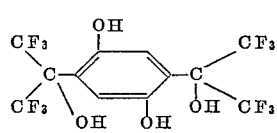

p,p'-bis(2-hydroxyhexafluoroisopropyl)diphenyl ether

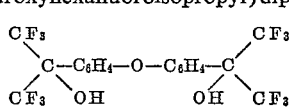

1,1-bis(chlorodifluoromethyl)-2-propyn-1-ol $$\underset{ClF_2C}{\overset{ClF_2C}{}}\!\!>\!\!\underset{OH}{\overset{}{C}}\!\!-C\equiv CH$$

1,1-bis(trifluoromethyl)-2-propyn-1-ol $$\underset{CF_3}{\overset{CF_3}{}}\!\!>\!\!\underset{OH}{\overset{}{C}}\!\!-C\equiv CH$$

1,1,4,4-tetrakis(ω-hydroperfluoroethyl)-2-butyn-1,4-diol

[H(CF$_2$)$_2$]$_2$C—C≡C—C[(CF$_2$)$_2$H]$_2$
  |                      |
  OH                     OH 1,1,4,4-tetrakis(chlorodifluoromethyl)-2-butyn-1,4-diol

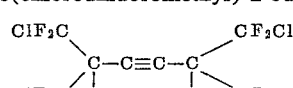

Perfluoro(1,1-cyclobutanediol)

$$\begin{matrix} F_2C-C \\ | \quad\quad |\!\!\!>\!\!OH \\ F_2C-CF_2\!\!>\!\!OH \end{matrix}$$

2-chloro-2,3,3,4,4-pentafluoro-1,1-cyclobutanediol $$\begin{matrix} ClFC-C \\ | \quad\quad |\!\!\!>\!\!OH \\ F_2C-CF_2\!\!>\!\!OH \end{matrix}$$

2,2-dichloro-3,3,4,4-tetrafluoro-1,1-cyclobutanediol $$\begin{matrix} Cl_2C-C \\ | \quad\quad |\!\!\!>\!\!OH \\ F_2C-CF_2\!\!>\!\!OH \end{matrix}$$

Perfluoro(cyclobutanol)

$$\begin{matrix} F_2C-C\!\!<\!\!F \\ | \quad\quad | \\ F_2C-CF_2\!\!>\!\!OH \end{matrix}$$

1-chlorohexafluorocyclobutanol $$\begin{matrix} F_2C-C\!\!<\!\!Cl \\ | \quad\quad | \\ F_2C\;\;\;CF_2\!\!>\!\!OH \end{matrix}$$

2,2-dichloropentafluorocyclobutanol $$\begin{matrix} Cl_2C-C\!\!<\!\!F \\ | \quad\quad | \\ F_2C-CF_2\!\!>\!\!OH \end{matrix}$$

1-cyanohexafluorocyclobutanol $$\begin{matrix} F_2C-C \\ | \quad\quad |\!\!\!>\!\!OH \\ F_2C-CF_2 \end{matrix}$$

1-phenylhexafluorocyclobutanol $$\begin{matrix} F_2C-C\!\!<\!\!\overset{C_6H_5}{} \\ | \quad\quad |\;\;\;OH \\ F_2C-CF_2 \end{matrix}$$

1-(p-hydroxyphenyl)-2,2-dichlorotetrafluorocyclobutanol $$\begin{matrix} Cl_2C-C\!\!<\!\!\overset{C_6H_4OH}{} \\ | \quad\quad |\;\;\;OH \\ F_2C-CF_2 \end{matrix}$$

1-(p-chlorophenyl)hexafluorocyclobutanol $$\begin{matrix} F_2C-C\!\!<\!\!\overset{C_6H_4Cl}{} \\ | \quad\quad |\;\;\;OH \\ F_2C-CF_2 \end{matrix}$$

1-(3,4-dichlorophenyl)hexafluorocyclobutanol $$\begin{matrix} F_2C-C\!\!<\!\!\overset{C_6H_3Cl_2}{} \\ | \quad\quad |\;\;\;OH \\ F_2C-CF_2 \end{matrix}$$

1-methoxyhexafluorocyclobutanol $$\begin{matrix} F_2C-C\!\!<\!\!\overset{OCH_3}{} \\ | \quad\quad |\;\;\;OH \\ F_2C-CF_2 \end{matrix}$$

1-ethoxy-2-chloro-2,3,3,4,4-pentafluorocyclobutanol

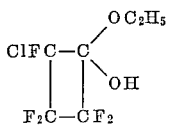

1,1,2,2-tetrahydroxy-3,3,4,4-tetrafluorocyclobutane

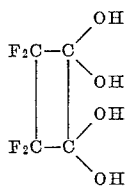

1,2 - dihydroxy - 1,2-dimethoxy-3,3,4,4-tetrafluorocyclobutane

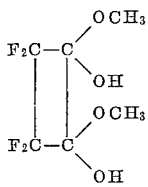

1,1,2 - trihydroxy - 2-ethoxy-3,3,4,4-tetrafluorocyclobutane

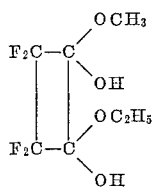

The remarkable solvent power of the polyfluoroalcohols defined by Formulas I, II and III is attributed to the fact that they possess very strong hydrogen bonding properties, and thus can form hydrogen bonds with polymers containing electron donors such as the acetal oxygens. Hydrogen bonding strength can be recognized by comparing the infrared absorption spectra of the alcohol being tested when determined (1) in a typical noncomplexing medium such as carbon tetrachloride, and (2) in a typical complexing, or bonding, medium such as tetrahydrofuran. With alcohols having hydrogen bonding properties, a displacement of the hydroxyl group absorption band is observed in the spectrum obtained in (2) relative to the spectrum obtained in (1). The magnitude of this displacement, or shift, is a measure of the hydrogen bonding power. With the polyfluoroalcohols defined by the above formulas, the wavelength of the infrared absorption band of the hydroxyl group when determined in tetrahydrofuran is displaced by a positive interval of at least 0.34 micron from its value when determined in carbon tetrachloride.

The following table indicates the magnitude of this wavelength displacement for a number of the polyfluoroalcohols suitable for use in the compositions of this invention. The second column shows the stretching mode wavelength in microns ($\lambda_s$, $\mu$) for the hydroxyl group when the alcohol is dissolved in carbon tetrachloride at 0.05 M concentration, a concentration as low as possible being desired to prevent or minimize interaction between the hydroxyl groups of the alcohol molecules. The third column shows the stretching mode wavelength in tetrahydrofuran (THF) at 1.0 M concentration, the concentration in this case being immaterial but preferably high enough to permit accurate determination of the absorption band. The fourth column shows the increase in absorption band wavelength ($\Delta\lambda_s$) produced by the formation of hydrogen bonds in the bonding solvent, tetrahydrofuran.

TABLE I

| Polyfluoroalcohol | $\lambda_s$, $\mu$ (unbonded) 0.05 M in CCl$_4$ | $\lambda_s$, $\mu$ (bonded) 1.0 M in THF | $\Delta\lambda_s$, $\mu$ |
|---|---|---|---|
| (CF$_3$)$_2$C(OH)CH(CF$_3$)$_2$ | 2.77 | 3.22+ | 0.45+ |
| H(CF$_2$)$_2$C(OH)$_2$(CF$_2$)$_4$H | 2.78 | 3.20 | 0.42 |
| CF$_2$ClC(OH)$_2$CFCl$_2$ | 2.79 | 3.20 | 0.41 |
| CFCl$_2$C(OH)$_2$CFCl$_2$ | 2.80 | 3.21 | 0.41 |
| (CF$_3$)$_2$CFCHOHCF(CF$_3$)$_2$ | 2.76 | 3.17 | 0.41 |
| (CF$_2$Cl)$_2$C(OH)C$_6$H$_5$ | 2.78 | 3.16 | 0.38 |
| (CF$_3$)$_2$C(OH)C$_6$H$_5$ | 2.79 | 3.17 | 0.38 |
| CF$_3$CHOHCF$_3$ | 2.77 | 3.12 | 0.35 |
| CFCl$_2$CHOHCF$_2$Cl | 2.77 | 3.14 | 0.37 |
| CF$_3$ClCHOHCF$_2$Cl | 2.77 | 3.11 | 0.34 |
| H(CF$_2$)$_2$CHOH(CF$_2$)$_4$H | 2.78 | 3.14 | 0.36 |
| CF$_2$ClC(OH)$_2$CF$_2$Cl | 2.80 | 3.15 | 0.35 |
| 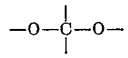 | 2.78 | 3.15 | 0.37 |

In contrast, polyhaloalcohols of closely related structure but not corresponding to Formulas I–III, e.g., primary polyfluoroalcohols and alcohols containing only one polyfluoroalkyl group, and previously proposed halogen- and hydroxyl-containing solvents for formaldehyde polymers, show an appreciably smaller wavelength displacement of the hydroxyl absorption bands under identical test conditions, as shown by the following table.

TABLE II

| Alcohol | $\lambda_s$, $\mu$ (unbonded) 0.05 M in CCl$_4$ | $\lambda_s$, $\mu$ (bonded) 1.0 M in THF | $\Delta\lambda_s$, $\mu$ |
|---|---|---|---|
| CF$_3$CH$_2$OH | 2.76 | 2.98 | 0.22 |
| (C$_6$H$_5$)$_2$C(OH)CF$_3$ | 2.78 | 3.05 | 0.27 |
| H(CF$_2$)$_3$CH$_2$OH | 2.75 | 2.98 | 0.23 |
| CF$_3$CF$_2$CH$_2$OH | 2.75 | 2.98 | 0.23 |
| H(CF$_2$)$_2$CH$_2$OH | 2.75 | 2.96 | 0.21 |
| CF$_3$(CF$_2$)$_2$CH(OH)$_2$ | 2.78 | 3.07 | 0.29 |
| CF$_3$CH(OH)$_2$ | 2.79 | 3.05 | 0.26 |
| ClCH$_2$CH$_2$OH | 2.77 | 2.91 | 0.14 |
| p-Chlorophenol | 2.75 | 2.98 | 0.23 |

Most of the polyfluoroalcohols defined by Formulas I, II and III are liquids at ordinary temperature. Others are solids with generally low or moderately high melting points. Such solids, however, are entirely suitable for use in the compositions of this invention since, at or slightly above their melting point, they readily dissolve polymers of the type defined above. In some cases, the solutions remain liquid at room temperature owing to the melting point-depressing effect of the solute. In other cases, they solidify to solid solutions, which can be reliquefied readily on warming when a fluid solution is needed. Furthermore, the normally solid polyfluoroalcohols are very suitable for the preparation of solid, homogeneous blends with the polymer, to which they impart plasticizing or softening effects.

The polymers with which this invention is concerned are the synthetic, high molecular weight, substantially linear polyacetals (this term including the polyketals) wherein the acetal oxygens are intralinear, i.e., integral members of the linear polymeric chain or "backbone", and are in open-chain configuration, i.e., not members of a cyclic structure. These polymers are characterized by the presence of repeating units containing the acetal linkage $$-\mathrm{O}-\underset{|}{\overset{|}{\mathrm{C}}}-\mathrm{O}-$$

the free valences of the acetal oxygens being attached to carbon atoms of the polymer chain and the depicted carbon forming part of a 1- to 4-carbon alkylene group. Polymers of this type, and the various methods by which they can be prepared, are well known in the art and require no further description.

The term "polymers" as used herein includes homopolymers containing solely identical acetal units; copolymers containing solely acetal units, but of two or more different types; and copolymers containing units other than acetal units, with the proviso, however, that in such copolymers at least two-thirds of the repeating units present are acetal units, in order that the copolymer possess the requisite characteristics of solubility in, and compatibility with, the polyfluoroalcohols which constitute the other essential ingredient in the compositions of this invention. Otherwise expressed, the copolymer should contain at least two-thirds, on a molar basis, of the acetal repeating unit or "mer", the remainder of the molecule (whose nature is immaterial and does not affect the solubility characteristics of the polymer) being the units of the polymerizable components with which the polyacetal-forming component copolymerizes. All of these polymers, of course, have end groups of various kinds whose nature is also immaterial from the standpoint of the present invention.

Many synthetic polyacetals of the type defined above have been described in the chemical literature. Among these may be mentioned in the first place the polyoxymethylenes, e.g., the formaldehyde polymers, and most importantly those described in U.S. Patent 2,768,994. The latter are distinguished from previously known polyoxymethylenes by either or both of two features, namely, by having a first order reaction rate constant for thermal degradation at 222° C. of less than 1% per minute, and/or by having a degree of toughness of at least 1. These polyoxymethylenes can be further improved with respect to thermal stability by acylation of the terminal hydroxyl groups, as described in U.S. Patents 2,964,500 and 2,998,409. The examples which follow illustrate the use of polyoxymethylenes of this type in the compositions of this invention.

It should be noted that various types of formaldehyde polymers are dissolved with more or less ease by the different kinds of solvents. Solvents of Formula I in which A is H or OH, particularly the latter, and R and R' are fluoroperhalomethyl, are generally more active than the other solvents embraced in Formulas I, II and III, and will dissolve the above-described formaldehyde polymers at room temperature or at their crystalline melting point. The more difficultly soluble polymers will, however, dissolve in the less active solvents under more drastic conditions such as increased temperature. The reason for this differing behavior is not fully understod but appears to depend in part upon the thermal history of the polymer. Even the polymers which present the greatest difficulty of solution can be dissolved at room temperature in the less active solvents after they have been dissolved and reprecipitated from other solvents.

Polymers other than formaldehyde polymers which come into consideration are the superpolyacetals and superpolyketals of U.S. Patent 2,071,252, for example polyhexamethylene formal, polydecamethylene formal, polyhexamethylene isobutyral or polyhexamethylene ketal. Suitable copolymers containing acetal linkages include, for example the formaldehyde/fluoroaldehyde copolymers of U.S. Patent 2,828,287, e.g., the copolymers of formaldehyde with trifluoroacetaldehyde or heptafluorobutyraldehyde. Other suitable acetal copolymers are the block copolymers (described in application Serial No. 91,318, filed by E. T. Cline on February 24, 1961) prepared by continuously introducing pure monomeric formaldehyde into a hydrocarbon reaction medium containing, in solution, a preformed polymeric substance having active hydrogen atoms as determined by the Zerewitinoff method, and a formaldehyde polymerization initiator. In this manner are produced block copolymers of formaldehyde with active hydrogen-containing polymers such as polyalkylene glycols (e.g., polyethylene glycol, polytetramethylene glycol), amino polymers such as methyl methacrylate/vinyloxyethylamine copolymers or hydrogenated butadiene/acrylonitrile copolymers, or polythiols such as polybutylenethiols. Further suitable acetal copolymers are those described in U.S. Patent 3,027,352, which are obtained by polymerizing trioxane with cyclic ethers such as, for example, ethylene oxide or 1,3-dioxolane.

The preferred polymers for use in this invention can be more specifically defined as: (1) polyacetals having the repeating unit

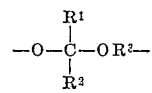

in which

is alkylene of 1–4 carbons and R³ is alkylene of 1–10 carbons; (2) copolymers of formaldehyde and fluoroaldehydes of the formula $QC_nF_{2n}CHO$ wherein Q is selected from the group consisting of hydrogen and fluorine and the subscript $n$ is an integer from 1 to 4; and (3) copolymers of formaldehyde and cyclic ethers selected from the group consisting of ethylene oxide and 1,3-dioxolane.

The polymer solvent mixtures of this invention are homogeneous, single-phase compositions. From the standpoint of physical characteristics, they comprise solid compositions in which the polymer is plasticized or otherwise modified with minor amounts of the polyfluoroalcohol, which may be as low as 0.5% by weight of the polymer, i.e., a weight ratio of 0.005:1; semisolid compositions, in which the polymer has incorporated therein sufficient amounts of the polyfluoroalcohol to make it readily deformable; highly viscous solutions; and fluid solutions, which can contain as much as 10,000% of the polyhaloalcohol by weight of the polymer, i.e., a weight ratio of 100:1. In general, the most useful compositions, which may be fluid or solid at room temperature, are those containing the polyfluoroalcohol and the polymer in weight ratios between 0.01:1 and 50:1.

As already noted, useful plasticized compositions are obtained from polyacetals and fluoroalcohols of Formula I where A is an aryl or aryloxyaryl group of 1 to 2 six-membered rings, particularly when this group bears one or more hydroxy substituent and/or a substituent $$-C\begin{matrix}R\\ \diagdown\\ OH\ R'\end{matrix}$$

where R and R' are defined as in Formula I. Fluoroalcohols of this type are strongly retained by the polymer, presumably through hydrogen bonds. In some cases, polymer compositons plasticized with these fluoroalcohols can be baked for one to two hours at temperatures as high as 70° C. in a vacuum, and withstand washing with water and exposure to atmospheric conditions, without serious loss of the bonded alcohol. The amount of fluoroalcohol plasticizer is generally in the range of 1–50% by weight of the total composition. With high molecular weight formaldehyde polymers, films containing 20–50% by weight of one of these high boiling fluoroalcohols were found to have lower modulus and higher flexibility in comparison with films made from the unmodified polymer.

The compositions of this invention further include those in which the surface of a shaped object (e.g., films, fiber, rod, tube, molded article) made from the acetal polymer is treated with a polyfluoroalcohol as defined, for example to impart adhesive properties to the surface by partial solution or swelling, or to create various surface effects such as roughening or etching. Contact between the surface of the polymeric substrate and the solvent can be effected by dipping, brushing, spraying, etc. The fluoroalcohol solvent may be used as such or, if it is desired to moderate its action, in a suitable dispersing or solvent medium such as water.

The compositios of this invention can contain more than one polyfluoroalcohol solvent. For example, it is sometimes advantageous to prepare a solution of polymer in a mixture of two or more polyfluoroalcohols, one of which is readily volatile while the other or others have low volatility and are retained, at least in part, within the polymer upon evaporation of the volatile solvent. The compositions, especially the fluid solutions, may also contain, in addition to the polyfluoroalcohol, an organic liquid miscible therewith, which liquid may have little or no solubilizing action toward the polyacetal, provided there is enough of the polyfluoroalcohol to hold the polymer in solution. Such compositions sometimes offer technical advantages, e.g., they may lend themselves better to the formation of shaped objects by extrusion or casting. Examples of suitable diluents include the aromatic hydrocarbons, e.g., benzene, toluene, the xylenes; aliphatic or cycloaliphatic hydrocarbons; halohydrocarbons, e.g., trichloroethylene, 1,2-dichlorotetrafluoroethane; alcohols, e.g., ethanol, isopropyl alcohol, cyclohexanol, ethylene glycol, including primary fluoroalcohols such as those having the formula $H(CF_2CF_2)_nCH_2OH$, obtainable by telomerization of tetrafluoroethylene in the presence of methanol; ethers, e.g., methoxyethanol, 1,2-dimethoxyethane, tetrahydrofuran; and the like. Water may also be present in amounts such that the polymer composition remains homogeneous. Thus, some polyfluoroketone hydrates (gem-diols) are capable of forming more or less well defined higher hydrates containing from about 0.5 to about 1.5 moles or sometimes up to 10 moles of additional water, an example of which is the compound corresponding in composition to $(CF_3)_2C(OH)_2 \cdot 1/2H_2O$. These higher hydrates are usually liquid at room temperature or below and they are very suitable for the compositions of this invention. Higher amounts of water can be tolerated in some cases.

The compositions can, of course, contain various nonessential, conventional ingredients such as resins, waxes, corrosion inhibitors, acid acceptors, ultraviolet light absorbers, fillers and other additives.

It is often advantageous, particularly with solutions of formaldehyde polymers and when such solutions are to be stored for an appreciable length of time, to have present in the solution a small amount, e.g., from 0.01 to 5% by weight, of an organic or inorganic base serving as a viscosity stabilizer to prevent degradation of the polymer on prolonged standing in solution. Suitable organic viscosity stabilizers are the primary, secondary and tertiary amines having a dissociation constant of at least $1 \times 10^{-9}$, examples of which are triethylamine, tri-n-butylamine, diethylamine, n-butylamine, pyridine, piperidine, hexamethylenediamine and cyclohexylamine. Inorganic bases effective as stabilizers include ammonia and the alkali metal hydroxides such as sodium hydroxide and potassium hydroxide.

The polymer-solvent compositions are prepared by the usual methods of blending, mixing, dissolving, etc., conventional in the polymer art. As already noted, the polyfluoroalcohol solvents defined above have the great advantage that, in most cases, they can be compounded with the polymer to form homogeneous blends or fluid solutions at low or moderate temperatures. Moreover, they are characterized by low flammability or even resistance to combustion with consequent decrease in the fire hazards normally present with organic solvents. A word of caution is indicated, however, since some fluoroalcohols, e.g., 1,3-dichloro-1,1,3,3-tetrafluoro-2,2-propanediol and perfluoro(2,3-dimethyl-2,3-butanediol), have toxic properties and should be handled with due care.

The following nonlimiting examples illustrate specific embodiments of the invention. The polymers used in these examples were polyoxymethylenes having molecular weights in excess of 30,000, as determined by measurements of the melt index and correlation of the values with osmotic pressure data on polymers of this type. More specifically, the polymers used in the examples were molding grade polyoxymethylene samples of molecular weight 39,000 and 43,000, and extrusion grade polyoxymethylene samples of molecular weight 68,000.

*Example 1*

A mixture of 0.5 g. of polyoxymethylene resin in the shape of molding fluff, and 15 ml. of 3H-tetradecafluoro-(2,4-dimethyl-3-pentanol)

$$(CF_3)_2CF-CHOH-CF(CF_3)_2$$

was stirred and warmed gently to give a clear solution. The solution was cast on a glass plate and the solvent was allowed to evaporate. The residual film separated readily from the glass giving a self-supporting, coherent film of the polyacetal.

The solvent in this example, which may also be called bis(perfluoroisopropyl)carbinol, was prepared by reduction of bis(perfluoroisopropyl)ketone with lithium aluminum hydride in tetrahydrofuran at 40–50° C. The resulting bis(perfluoroisopropyl)carbinol/tetrahydrofuran 1:1 complex was distilled (B.P. 133° C.) and decomposed with 20% oleum to give bis(perfluoroisopropyl) carbinol, B.P. 113–114° C.

*Example 2*

The ends of two pieces of a pipe, 1″ in diameter, made of polyoxymethylene were moistened with 1,3-dichloro-1,1,3,3-tetrafluoro-2,2-propanediol and pressed together and the assembly was allowed to dry. The two sections were firmly welded together as a single pipe which did not leak at the seam.

The 1,3 - dichloro - 1,1,3,3 - tetrafluoro - 2,2 - propanediol used in this and other examples, which may also be called s-dichlorotetrafluoroacetone hydrate, was prepared by dropwise addition of 55 g. (3.04 moles) of water to 607 g. (3.04 moles) of s-dichlorotetrafluoroacetone. It boils at 106° C. with decomposition.

*Example 3*

Two pieces of polyoxymethylene piping were welded together as described in Example 2, using as the polymer solvent perfluoro(2,3-dimethyl-2,3-butanediol), $$\begin{array}{cc} (CF_3)_2C\!\!-\!\!\!-\!\!\!-C(CF_3)_2 \\ | \quad\quad | \\ OH \quad OH \end{array}$$

This alcohol, which is also called perfluoropinacol, is a new compound. It can be prepared by irradiation with ultraviolet light of a mixture of hexafluoroacetone and a primary or secondary alcohol, e.g., isopropyl alcohol. The resulting reaction product is an addition complex from which the perfluoropinacol can be recovered by distillation from concentrated sulfuric acid. It boils at 129° C. and melts at 26° C.

*Example 4*

A solution was prepared of 1.0 g. of molding grade polyoxymethylene in 25 ml. of 1,3-dichloro-1,1,3,3-tetrafluoro-2,2-propanediol containing a few drops of triethylamine as a viscosity stabilizer. The solution was poured slowly with vigorous stirring into 400 ml. of water contained in a conventional blender. A white pulp of polymer fibrils suspended in water was obtained. The fibrils were collected on a 100-mesh stainless steel wire screen placed on a suction funnel, and the mat that formed was sucked dry. This mat formed a tough paper suitable for use as filter paper.

*Examples 5–18*

Solutions of polyoxymethylene were prepared in the polyfluoroalcohols whose structures and boiling points (or melting points) are listed in the following table. In the case of liquid alcohols, the solutions were made at room temperature or on gentle warming of the mixed ingredients. With the normally solid alcohols, solution was effected by maintaining the mixture at or slightly above the melting point of the alcohol for a brief period.

All the resulting solutions contained at least 2.5% by weight of the polyacetal. In several cases, solutions containing as much as 35% by weight of the polyacetal were obtained and found to be stable at 25° C., i.e., there was no separation of the solute. Coherent films were obtainable by casting of the fluid solutions. With the solid polyfluoroalcohols, highly plasticized, homogeneous solid solutions were obtained which could be used for adhesive or molding purposes.

TABLE III

| Ex. | Polyfluoroalcohol | B.P., ° C. |
|---|---|---|
| 5 | $F_2C-C(Cl)(OH)-CF_2$ ring with $F_2C-CF_2$ | 68 (some dec.). |
| 6 | $CF_3-C(CF_3)(OH)-CH(CF_3)_2$ | 95. |
| 7 | $ClF_2C-C(OH)(OH)-CFCl_2$ | 100, dec. |
| 8 | $CF_3-C(OH)(OH)-CF_3$ | M.P. 45° C. Solution made at 45° C. |
| 9 | $ClF_2C-C(C_6H_5)(OH)-CF_2Cl$ | 99 (8 mm.). |
| 10 | $ClF_2C-C(OCH_3)(OH)-CF_2Cl$ | 106. |
| 11 | $F_2C-C(OH)-CF_2$ ring with $F_2C-CF_2-OH$ | M.P. 50° C. Solution made at 60° C. |
| 12 | $F_2C-C(CN)-CF_2$ ring with $F_2C-CF_2-OH$ | M.P. 53° C. Solution made at 60° C. |
| 13 | $F_2C-C(C_6H_5)-CF_2$ ring with $F_2C-CF_2-OH$ | 134 (130 mm.). |
| 14 | $CF_3-CHOH-CF_3$ | 59. |
| 15 | $CF_3-C(C_6H_5)(OH)-CF_3$ | 50 (10 mm.). |
| 16 | $F_2C-C(C_6H_4-CH_3)-CF_2$ ring with $F_2C-CF_2-OH$ | 98 (11 mm.). |
| 17 | $H(CF_2)_2-CHOH-(CF_2)_4H$ | 170. |
| 18 | $ClF_2C-CHOH-CF_2Cl$ | 107. |

The solvent used in Example 14 above, 2H-hexafluoro-2-propanol, also called 1,1,1,3,3,3-hexafluoro-2-propanol, is a new compound whose volatility makes it particularly valuable for the purposes of this invention since it can be easily and quickly removed by evaporation from shaped polymer structures, such as films or filaments. Another advantage of this solvent is its very low toxicity. This product can be prepared by reduction of hexafluoroacetone, as described below.

Through a solution of 4 g. of lithium aluminum hydride in 100 ml. of tetrahydrofuran was passed the gas formed by evaporating 15 ml. (measured as the liquid at −78° C.) of hexafluoroacetone. The rate of addition was regulated so that the temperature of the reaction mixture was maintained at 40–50° C. by the heat of the reaction. After completion of the reaction, the excess lithium aluminum hydride was decomposed by addition of aqueous tetrahydrofuran, then of 10% hydrochloric acid. The organic layer was separated and washed twice with water. The resulting 2H-hexafluoro-2-propanol/tetrahydrofuran 1:1 complex was distilled (22 g., B.P. 99–100° C.). Twenty grams of this complex was decomposed by treatment with 50 ml. of 20% oleum and the product was distilled at 1–2 mm. pressure. Redistillation of this distillate gave 17.1 g. of pure 2H-hexafluoro-2-propanol, B.P. 59° C., $n_D^{20}$ <1.3.

*Anal.*—Calc'd for $C_3F_6H_2O$: C, 21.44; H, 1.20; F, 67.84. Found: C, 21.68; H, 1.20; F, 67.84.

This product can also be prepared by catalytic reduction. For example, subjecting a mixture of 100 g. of hexafluoroacetone and 0.5 g. of platinum oxide to a temperature increasing from 110 to 150° C. and a hydrogen pressure increasing from 200 to 900 atmospheres over a period of 6 hours gives 2H-hexafluoro-2-propanol in 90% yield.

The solvent used in Example 6, 3H-dodecafluoro(2,3-dimethyl-2-butanol), is also a new product. It was prepared by stirring at room temperature a mixture of 30 g. (0.1 mole) of tetrakis(trifluoromethyl)ethylene, 10 ml. of water, 3 ml. of triethylamine and 50 ml. of acetonitrile. After 2 days, the mixture became homogeneous. Water (100 ml.) was added and the organic layer was separated, washed with 10% hydrochloric acid and water again, dried over silica gel and distilled to give 20.6 g. of the adduct of the alcohol and acetonitrile as a colorless liquid, B.P. 107° C. The acetonitrile was removed from this complex by washing it with 20% oleum. The pure alcohol was obtained on redistillation as a colorless liquid, B.P. 95–96° C.

*Anal.*—Calc'd for $C_6F_2F_{12}O$: C, 22.65; H, 0.64; F, 71.68. Found: C, 23.22; H, 0.87; F, 72.17.

*Example 19*

Solutions were prepared containing 1–10% by weight of polyoxymethylene in 1,3-dichloro-1,1,3,3-tetrafluoro-2,2-propanediol, and about 1.0% of triethylamine was added as a viscosity stabilizer. These solutions were used as described below to impreginate various porous materials.

(a) Filter paper was dipped in a solution of 1% concentration and the solvent was removed by evaporation at 20–25° C. The paper showed a weight gain of 12.5%. Its wet strength was substantially improved but it was in other respects similar to the untreated paper. At a higher weight gain of the order of 50%, obtained by using a more concentrated solution (5% of polyacetal by weight) the paper was stiffened and showed decided water-repellent properties.

(b) Cotton and wool fabrics impregnated by application of the solution with a doctor knife followed by evaporation of the solvent at 20–25° C. showed improved dimensional stability on washing, yet accepted dyes readily. Provided the weight gain did not exceed about 5%, the fabrics showed very little increase in stiffness.

*Example 20*

The solutions of Example 19 were used for coating purposes on wood and metal as follows:

(a) A solution containing 5% by weight of the polyacetal was applied on a wood panel by dipping the panel into the solution and evaporating the solvent at 70° C. There was obtained an abrasion-resistant coating which materially decreased the ability of the wood to catch fire and support combustion.

(b) A steel panel was coated by dipping into a 5% solution of the polyacetal. After removal of the solvent at 70° C., a tough, abrasion-resistant coating was produced that efficiently protected the metal from rusting.

Example 21

A solution containing 8% by weight of polyoxymethylene was prepared in which the solvent was a mixture of 60 parts by volume of 1,3-dichloro-1,1,3,3-tetrafluoro-2,2-propanediol and 40 parts by volume of benzene, a nonsolvent for the polyacetal. This solution was cast on a polished metal plate that had been preheated to approximately 65° C. After casting, the plate temperature was increased to about 80° C. and held at that point for about 15 minutes to complete the removal of the solvent. The polymer film was readily detachable from the support. It was a smooth, strong film approximately 2 mils thick.

Examples 22–28

Solutions containing about 5% by weight of polyoxymethylene were prepared in various polyfluoroalcohols. Table IV below summarizes these examples, listing the solvents by formulas, with their boiling points or melting points. The solution were made at room temperature unless otherwise noted. These solutions were used to prepare either coatings on various substrates, or self-supporting films of the polymer.

TABLE IV

| Ex. | Polyfluoroalcohol | B.P., ° C. |
| --- | --- | --- |
| 22 | $ClF_2C-\underset{\underset{OH}{\|}}{\overset{\overset{OH}{\|}}{C}}-CF_2Cl$ with phenyl ring | M.P. 132° C. (solution made at 132° C.). |
| 23 | $ClF_2C-\underset{\underset{OH}{\|}}{\overset{\overset{OH}{\|}}{C}}-CFCl_2$ with phenyl ring | M.P. 142–3° C. (solution made at 142° C.). |
| 24 | $ClF_2C-\underset{\underset{OH}{\|}}{\overset{\overset{OH}{\|}}{C}}-CF_2Cl$ with ethyl-substituted phenyl ring ($C_2H_5$) | M.P. 80° C., (solution made at 80° C.). |
| 25 | $F_2C-\overset{OH}{\underset{\|}{C}}-C\overset{CH-CH}{\underset{CH=CH}{\diagup\diagdown}}C-Cl$, $F_2C-CF_2$ | B.P. 110° C. (10 mm.). |
| 26 | $ClF_2C\diagdown \atop ClF_2C\diagup C-C\equiv CH$, OH | B.P. 144° C. |
| 27 | $ClF_2C\diagdown \atop ClF_2C\diagup \underset{OH}{C}-C\equiv C-\underset{OH}{C}\diagup CF_2Cl \atop \diagdown CF_2Cl$ | B.P., 114° C. (14 mm.). M.P. 50–51° C. (solution made at 60° C.). |
| 28 | Mixtures of $(CF_2Cl)_2C\diagup OH \atop \diagdown OH$ with 37+ of $CF_3CF_2CF_2OH$[1]. | |

[1] The primary alcohol $CF_3CF_2CF_2OH$ is essentially a non-solvent for the formaldehyde polymer.

Example 29

To one mole of perfluoro-2,2-propanediol (or hexafluoro-acetone hydrate, $(CF_3)_2C(OH)_2$, M.P. 45° C.) was slowly added about one-half mole of water. The mixture formed a liquid compound, corresponding in composition to $(CF_3)_2C(OH)_2 \cdot \frac{1}{2}H_2O$, which remained liquid and stable at room temperature. This liquid was used to dissolve approximately 5% by weight of polyoxymethylene. Solution took place readily at room temperature. The resulting solution was cast on a glass plate. Evaporation of the solvent at room temperature left a tough, coherent polymer film.

Examples 30–32

These examples illustrate the plasticization of polyoxymethylene films with polyfluoroalcohols containing aromatic groups. These films were made from solutions of polyoxymethylene in 1,3-dichloro-1,1,3,3-tetrafluoro-2,2-propanediol also containing a minor amount of plasticizing polyfluoroalcohol. The solutions had the following respective compositions, in part by weight:

Example 30:

Polyoxymethylene ---------- 10
$(CF_2Cl)_2C(OH)_2$ ---------- 85
$\underset{CF_2Cl}{CF_2Cl}\diagdown \underset{OH}{C}-$ phenyl ---------- 5

Example 31:

Polyoxymethylene ---------- 1
$(CF_2Cl)_2C(OH)_2$ ---------- 5
$\underset{H(CF_2)_4}{H(CF_2)_2}\diagdown \underset{OH}{C}-$ phenyl $-OH$ ---------- 0.25

Example 32:

Polyoxymethylene ---------- 1
$(CF_2Cl)_2C(OH)_2$ ---------- 5
$\underset{CFCl_2}{CF_2Cl}\diagdown \underset{OH}{C}-$ phenyl $-OH$ ---------- 0.25

Films were cast either on a metal plate or on a glass plate and the volatile solvent was evaporated at 80° C. In all cases, the dried films had lower modulus and improved flexibility in comparison with unplasticized polyoxymethylene films such as that of Example 21.

Example 33

A solution was prepared of 10 g. of polyoxymethylene in a mixture of 2.5 g. of p,p'-bis(2-hydroxyhexafluoroisopropyl)diphenyl ether, 67.5 g. of 1,3-dichloro-1,1,3,3-tetrafluoro-2,2-propanediol containing 1% of triethylamine, 10 g. of benzene and 10 g. of toluene. This solution was cast onto a polished metal plate heated to 60° C., and the resulting film was baked for 4 hours at 80° C. The dried film was about twice as flexible as an unplasticized film of the same polymer.

Example 34

Molded bars were made from samples of molding grade polyoxymethylene which had been mixed with, respectively, 5, 10, 20 and 40% by weight of p,p'-bis(2-hydroxyhexafluoroisopropyl)diphenyl ether. Moldings from the last three compositions were substantially more flexible than unplasticized moldings from the same polymer.

The compositions of this invention have many and varied technical applications. The foregoing examples have illustrated some of their uses, including the preparation of self-supporting films, of molded articles and of protective coatings on various surfaces, the impregnation of paper and textile fabrics, and the bonding together of articles made of the polymeric ingredient. Fluid polymer solutions are further eminently suitable for many other uses, such as solution spinning of filaments, rods or tubes, wire coating, etc. Solutions of suitable viscosity are useful as adhesives to join together surfaces such as wood, metals, ceramics, plastics, etc. Solid plasticized compositions containing minor amounts of polyhaloalcohol solvents are suitable as molding powders for use in the fabrication of shaped objects, for example by injection molding or compression molding, or by melt extrusion into films, rods, tubes and other shapes.

Since obvious modifications and equivalents in the invention will be evident to those skilled in the chemical arts, I propose to be bound solely by the appended claims.

The embodiments of the invention in which an exclusive property or privilege is claimed are defined as follows:

1. A composition of matter comprising, in intimate homogeneous admixture,
   (A) a synthetic, essentially linear polymer having a molecular weight of at least 5000 in which at least two-thirds of the repeating units contain open-chain acetal linkages, said polymer being selected from the group consisting of
      (I) polyacetals in which said repeating units are

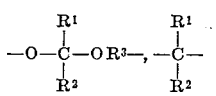

being alkylene of 1–4 carbons and $R^3$ being alkylene of 1–10 carbons;
      (II) copolymers of formaldehyde and fluoroaldehydes of the formula $QC_nF_{2n}CHO$ wherein Q is selected from the group consisting of hydrogen and fluorine and the subscript $n$ is an integer from 1 to 4; and
      (III) copolymers of formaldehyde and cyclic ethers selected from the group consisting of ethylene oxide and 1,3-dioxolane, and
   (B) at least one polyhaloalcohol, in which all halogen atoms are of atomic number 9–17, selected from the group consisting of

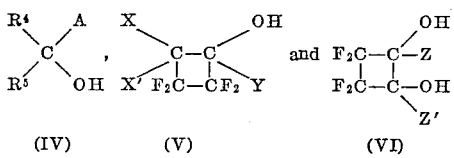

wherein:
      $R^4$ and $R^5$ are selected from the group consisting of fluoroperhalomethyl, difluoromethyl, perfluoroalkyl of 2–4 carbons, ω-hydroperfluoroalkyl of 2–4 carbons and ω-chloroperfluoroalkyl of 2–4 carbons;
      A is selected from the group consisting of $R^4$, hydrogen, hydroxyl, halogen, cyano, alkyl of 1–2 carbons, alkoxy of 1–2 carbons, fluoroalkyl of 1–4 carbons, fluorohydroxyalkyl of 1–4 carbons,

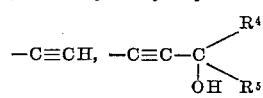

aryl of 1–2 six-members rings and aryloxyaryl of 1–2 six-membered rings, the aryl nuclei in the two last-mentioned groups bearing 0–1 substituent of the formula

and 0–3 substituents of the group consisting of hydroxy, halogen and alkyl of 1–2 carbons;
      X and X' are selected from the group consisting of fluorine and chlorine;
      Y is selected from the group consisting of hydroxyl, halogen, cyano, phenyl, halophenyl, hydroxyphenyl and alkoxy of 1–2 carbons; and
      Z and Z' are selected from the group consisting of hydroxyl and alkoxy of 1–2 carbons.

2. A composition of matter of claim 1 in the form of a solution.

3. A composition of matter of claim 1 in the form of a plasticized polymer.

4. A composition of matter of claim 1 wherein the polymer is a polyoxymethylene.

5. A composition of matter of claim 4 containing additionally, a member of the group consisting of amines having a dissociation constant of at least $1 \times 10^{-9}$, ammonia and alkali metal hydroxides.

6. A solution of a polyoxymethylene having a molecular weight of at least 5000 in 2-phenylhexafluoro-2-propanol.

7. A solution of a polyoxymethylene having a molecular weight of at least 5000 in 1,3-dichloro-1,1,3,3-tetrafluoro-2,2-propanediol.

8. A solution of a polyoxymethylene having a molecular weight of at least 5000 in perfluoro(1,1-cyclobutanediol).

9. A solution of a polyoxymethylene having a molecular weight of at least 5000 in hexafluoro-2,2-propanediol.

10. A solution of a polyoxymethylene having a molecular weight of at least 5000 in 2H-hexafluoro-2-propanol.

11. A solution of a polyoxymethylene having a molecular weight of at least 5000 in 1H,3H,7H-dodecafluoro-3-heptanol.

12. A synthetic, essentially linear polymer having a molecular weight of at least 5000 in which at least two-thirds of the repeating units contain open-chain acetal linkages, said linear polymer being selected from the group consisting of
   (I) polyacetals in which said repeating units are

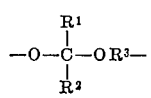

in which

is alkylene of 1–4 carbons and $R^3$ is alkylene of 1–10 carbons;
   (II) copolymers of formaldehyde and fluoroaldehydes of the formula $QC_nF_{2n}CHO$ wherein Q is selected from the group consisting of hydrogen and fluorine and the subscript $n$ is an integer from 1 to 4; and
   (III) copolymers of formaldehyde and cyclic ethers selected from the group consisting of ethylene oxide and 1,3-dioxolane,
plasticized by means of
   at least one polyhaloalcohol in which all halogen atoms are of atomic number 9–17 selected from the group consisting of

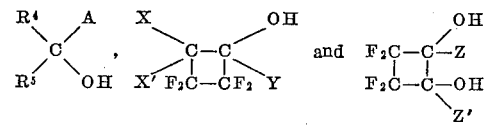

wherein:
      $R^4$ and $R^5$ are selected from the group consisting of fluoroperhalomethyl, difluoromethyl, perfluoroalkyl of 2–4 carbons, ω-hydroperfluoroalkyl of 2–4 carbons and ω-chloroperfluoroalkyl of 2–4 carbons;
      A is selected from the group consisting of $R^4$, hydrogen, hydroxyl, halogen, cyano, alkyl of 1–2 carbons, alkoxy of 1–2 carbons, fluoroalkyl of 1–4 carbons, fluorohydroxyalkyl of 1–4 carbons,

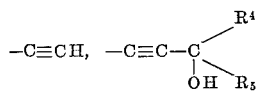

aryl of 1–2 six-membered rings and aryloxyaryl of 1–2 six-membered rings, the aryl nuclei in the two last-mentioned groups bearing 0–1 substituent of the formula

and 0–3 substituents of the group consisting of hydroxy, halogen and alkyl of 1–2 carbons;

X and X' are selected from the group consisting of fluorine and chlorine;

Y is selected from the group consisting of hydroxyl, halogen, cyano, phenyl, halophenyl, hydroxyphenyl and alkoxy of 1–2 carbons; and Z and Z' are selected from the group consisting of hydroxyl and alkoxy of 1–2 carbons.

13. The composition of matter of claim 12 wherein the polymer is a polyoxymethylene.

14. A polyoxymethylene having a molecular weight of at least 5000 plasticized by 1,3-dichloro-1,1,3,3-tetrafluoro-2,2-propanediol.

15. A polyoxymethylene having a molecular weight of at least 5000 plasticized by 1,3-dichloro-1,1,3,3-tetrafluoro-2-phenyl-2-propanol.

16. A polyoxymethylene having a molecular weight of at least 5000 plasticized by 1H,7H-3-(p-hydroxyphenyl)-dodecafluoro-3-heptanol.

17. A polyoxymethylene having a molecular weight of at least 5000 plasticized by 1,3-dichloro-1,1,3,3-tetrafluoro-2-(p-hydroxyphenyl)-2-propanol.

18. A polyoxymethylene having a molecular weight of at least 5000 plasticized by p,p'-bis(2-hydroxyhexafluoroisopropyl)diphenyl ether.

References Cited by the Examiner
UNITED STATES PATENTS

| | | | |
|---|---|---|---|
| 2,775,570 | 12/1956 | Barkdell et al. | 260—33.4 |
| 2,927,906 | 3/1960 | Schlack | 260—33.4 |
| 2,982,789 | 5/1961 | Smith | 260—633 |
| 2,984,640 | 5/1961 | Kaplan | 260—33.4 |
| 2,996,471 | 8/1961 | Reiter | 260—33.4 |
| 2,999,884 | 9/1961 | Weinmayr | 260—633 |
| 3,030,409 | 4/1962 | Andreades et al. | 260—633 |
| 3,129,248 | 4/1964 | England | 260—586 |

OTHER REFERENCES

F. W. Billmeyer, Jr.: "Textbook of Polymer Chemistry," Interscience Publishers Inc., N.Y., 1957. Pages 317, 318 relied upon.

J. F. Cogdell and R. H. Hardesty: "Delrin Acetal Resin," E. I. du Pont de Nemours & Co. Inc., Wilmington, Del., pages 1, 4, 13 and Table I relied upon.

MORRIS LIEBMAN, *Primary Examiner.*